US012312205B2

(12) United States Patent
Jang et al.

(10) Patent No.: US 12,312,205 B2
(45) Date of Patent: May 27, 2025

(54) APPARATUS AND METHOD FOR DETECTING SKEW OF BANKNOTES IN ATM

(71) Applicant: Hyosung TNS Inc., Seoul (KR)

(72) Inventors: Hyun Soo Jang, Suwon-Si (KR); Jin You Lim, Anyang-si (KR); Da Hye Shin, Incheon (KR)

(73) Assignee: Hyosung TNS Inc., Seoul (KR)

( * ) Notice: Subject to any disclaimer, the term of this patent is extended or adjusted under 35 U.S.C. 154(b) by 191 days.

(21) Appl. No.: 18/337,078

(22) Filed: Jun. 19, 2023

(65) Prior Publication Data

US 2024/0029495 A1 Jan. 25, 2024

(30) Foreign Application Priority Data

Jul. 19, 2022 (KR) ........................ 10-2022-0088699

(51) Int. Cl.

*B65H 7/14* (2006.01)
*B65H 9/00* (2006.01)
*G07D 11/17* (2019.01)
*G07D 11/22* (2019.01)

(52) U.S. Cl.

CPC ................. *B65H 7/14* (2013.01); *B65H 9/00* (2013.01); *G07D 11/17* (2019.01); *G07D 11/22* (2019.01); *B65H 2511/216* (2013.01); *B65H 2511/24* (2013.01); *B65H 2701/1311* (2013.01); *B65H 2701/1912* (2013.01)

(58) Field of Classification Search

CPC ... B65H 7/08; B65H 7/14; B65H 9/20; B65H 2553/416; B65H 2553/80; B65H 2553/82; B65H 2511/24; G07D 11/17; G07D 11/22

See application file for complete search history.

(56) References Cited

U.S. PATENT DOCUMENTS 7,472,905 B2 * 1/2009 Inoue ..................... B65H 9/006 271/227
7,959,151 B2 * 6/2011 Fukube .................... B65H 7/14 271/259
9,027,729 B2 * 5/2015 Furuichi ................ G07D 11/50 194/206

FOREIGN PATENT DOCUMENTS

KR 10-2019-0121518 A 10/2019

* cited by examiner

*Primary Examiner* — Jeremy R Severson
(74) *Attorney, Agent, or Firm* — WTA Patents

(57) ABSTRACT

The present invention relates to an apparatus for detecting a skew of banknotes in an automated teller machine (ATM), and particularly, to an apparatus for detecting a skew of banknotes in an ATM capable of more effectively and accurately detecting a defective conveying state of the banknotes passing through a conveying route by including sensors on the conveying route, where the banknotes put into the ATM are conveyed, at regular intervals from each other along a direction crossing the conveying route and detect tips of the banknotes passing through the conveying route to separately detect skew angles for each sector of the banknotes passing through the conveying route based on banknote tip detection signals detected from each detection sensor and support detection of various types of skews of the banknotes, including one-way skew of the banknotes and V-shaped skew at both ends inclined in different directions.

7 Claims, 4 Drawing Sheets

APPARATUS AND METHOD FOR DETECTING SKEW OF BANKNOTES IN ATM

CROSS-REFERENCE TO RELATED APPLICATIONS

This application claims priority to Republic of Korea Patent Application No. 10-2022-0088699, filed on Jul. 19, 2022, which is incorporated by reference herein in its entirety.

TECHNICAL FIELD

The present invention relates to an apparatus for detecting a skew of banknotes in an automated teller machine (ATM), and more particularly, to an apparatus for detecting a skew of banknotes in an ATM capable of more effectively and accurately detecting a defective conveying state of the banknotes passing through a conveying route by including a plurality of sensors configured to be arranged on the conveying route, where the banknotes put into the ATM are conveyed, at regular intervals from each other along a direction crossing the conveying route and detect tips of the banknotes passing through the conveying route to separately detect skew angles for each sector of the banknotes passing through the conveying route based on banknote tip detection signals detected from each detection sensor and support detection of various types of skews of the banknotes, including one-way skew of the banknotes as well as V-shaped skew at both ends inclined in different directions, and a method of detecting a skew of banknotes in an ATM.

BACKGROUND ART

In general, an automated teller machine (ATM) is mainly used for deposit and withdrawal of banknotes in financial institutions such as banks. Banknotes put into or taken out of the ATM by a request of a user for deposit and withdrawal are conveyed along a conveying route and are stored in a banknote cassette storing banknotes or are withdrawn through a deposit and withdrawal unit.

In this case, however, the banknotes conveyed in the ATM have a skew in which the banknotes are conveyed in a certain tilted state due to various reasons that occur during the input, drawing out, or conveyance of the banknote. The skew of the banknotes may cause operation errors such as jamming of the banknotes or damage to the banknotes during the transportation or loading of the banknotes into the banknote cassette. Accordingly, it is necessary to accurately detect a skew of banknotes passing through the conveying route and correct or recover the skew to prevent damage to the banknotes or malfunction of equipment.

Accordingly, as described in Patent No. 10-2019-0121518 as the related art, methods such as a method of detecting and correcting a skew of banknotes based on signals passing through tips of both ends of the banknotes detected by a pair of detection sensors provided on both sides of the tips of the banknotes passing through a conveying route through a plurality of detection sensors provided on the conveying route of the ATM in a direction crossing the conveying route are applied.

However, in the related art such as the above-mentioned Patent No. 121518, in detecting a skew of banknotes, a skew angle of the banknotes is detected using a pair of sensors disposed at both ends of a plurality of sensors provided on a conveying route. The method may be applied relatively usefully to detect a skew of banknotes tilted in one direction, but has a limitation in that it cannot effectively consider the skew of the banknotes that are conveyed after being deformed into an irregular shape, such as banknotes in which banknotes are partially crumpled or conveyed in a folded state, and thus, has a problem in that it cannot effectively prevent the occurrence of failures of the ATM such as jamming of the banknotes or operation errors of operation units during the conveyance, separation, or drawing out of the banknotes.

SUMMARY

The present invention has been made to solve the above problems, and the present invention provides an apparatus for detecting a skew of banknotes in an ATM capable of more effectively and accurately detecting a defective conveying state of the banknotes passing through a conveying route by including a plurality of sensors configured to be arranged on the conveying route, where the banknotes put into the ATM are conveyed, at regular intervals from each other along a direction crossing the conveying route and detect tips of the banknotes passing through the conveying route to separately detect skew angles for each sector of the banknotes passing through the conveying route based on banknote tip detection signals detected from each detection sensor and support detection of various types of skews of the banknotes, including one-way skew of the banknotes as well as V-shaped skew at both ends inclined in different directions, and a method of detecting a skew of banknotes in an ATM.

To achieve the above object, an apparatus for detecting a skew of banknotes conveyed along a conveying route in an ATM includes: a plurality of detection sensors configured to be arranged on a conveying route at regular intervals from each other along a direction crossing the conveying route and detect tips of the banknotes passing through the conveying route; and a microprocessor configured to determine whether the banknotes passing through the conveying route are skewed based on banknote tip detection signals detected from each sensor, in which the microprocessor divides the banknotes into a plurality of sectors along a width direction of the banknotes passing through the conveying route, calculates skew angles for each sector of the divided banknotes based on the banknote tip detection signals detected by each of the detection sensors, and adds up the calculated skew angles for each sector and detecting a skew amount of banknotes to determine whether the banknotes conveyed along the conveying route are skewed.

An apparatus for detecting a skew of banknotes in an automated teller machine according to the present invention includes a plurality of sensors configured to be arranged on the conveying route where the banknotes put into the ATM are conveyed and detect tips of the banknotes passing through the conveying route to separately detect skew angles for each sector of the banknotes passing through the conveying route based on banknote tip detection signals detected from each detection sensor and support detection of various types of skews of the banknotes, including one-way skew of the banknotes as well as V-shaped skew at both ends inclined in different directions, thereby more effectively and accurately detecting a defective state of the banknotes passing through the conveying route and preventing operational errors, such as jams that may occur in subsequent operations due to the skew of the banknotes, in advance.

DETAILED DESCRIPTION

The present invention may have various changes and various forms. Hereinafter, specific embodiments of the present invention will be described in detail with reference to the drawings, but the present invention is not limited to the following embodiments unless departing from the gist thereof.

Figure 1:
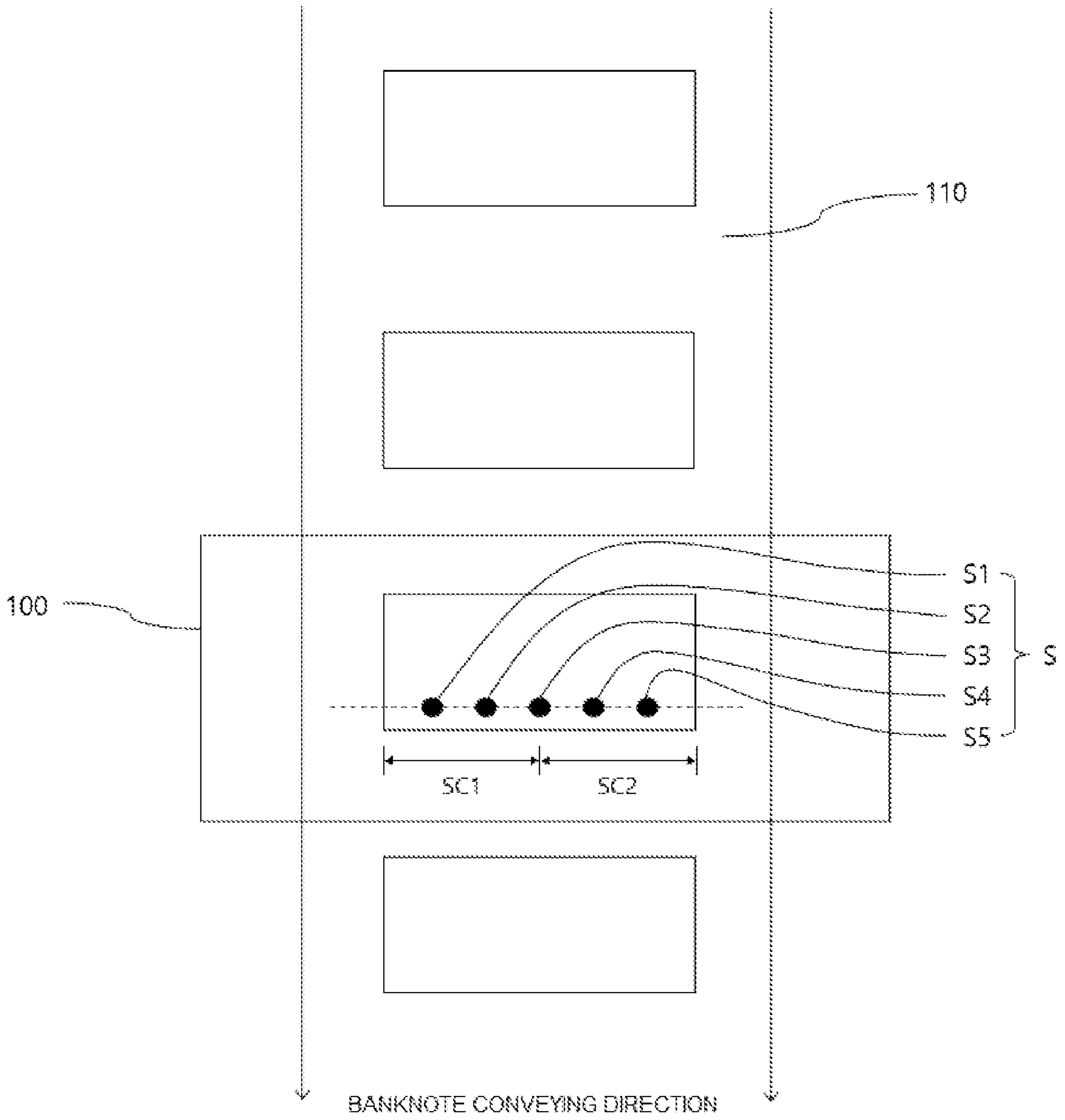
FIG. 1 is a diagram for describing a configuration of an apparatus for detecting a skew of banknotes in an automated teller machine according to an embodiment of the present invention.

FIG. 1 is a diagram for describing a configuration of an apparatus for detecting a skew of banknotes in an automated teller machine according to an embodiment of the present invention.

As illustrated in FIG. 1, an apparatus 100 for detecting a skew of banknotes in an automated teller machine (ATM) according to an embodiment of the present invention is configured to include a plurality of detection sensors S that are arranged on a conveying route 110, where the banknotes put into the ATM are conveyed, at regular intervals from each other along a direction crossing the conveying route 110 and detect tips of the banknotes passing through the conveying route 110, and a microprocessor (not illustrated) that detects skew angles for each sector of the banknotes passing through the conveying route based on banknote tip detection signals detected from each sensor S1, S2, S3, S4, and S5 and determines the total skew amount of the passing banknotes.

That is, according to the present invention, the plurality of detection sensors S detecting the tips of the banknotes passing through the conveying route 110 are provided on the conveying route 110 inside the ATM to separately detect skew angles for each sector of the banknotes passing through the conveying route 110 based on banknote tip detection signals detected from each detection sensor. According to the present embodiment, a process of dividing the passing banknote into left and right two sectors SC1 and SC2 and detecting the skew of the banknotes by using five detection sensors S1 to S5 disposed at regular intervals from each other along a direction crossing the conveying route 110 and in this regard, a process of detecting the skew angles for each sector of the passing banknote will be described in more detail with reference to FIGS. 2A through 2C.

Here, the detection sensor S provided in the apparatus 100 for detecting a skew of banknotes may be applied with various types of sensors for detecting whether the banknote enters, and an optical sensor or the like including a pair of a light emitting element and a light receiving element may be applied.

Hereinafter, a process of detecting a skew of banknotes through the apparatus for detecting a skew of banknotes according to the embodiment of the present invention will be described in more detail with reference to FIGS. 2A through 2C.

Figure 2A:
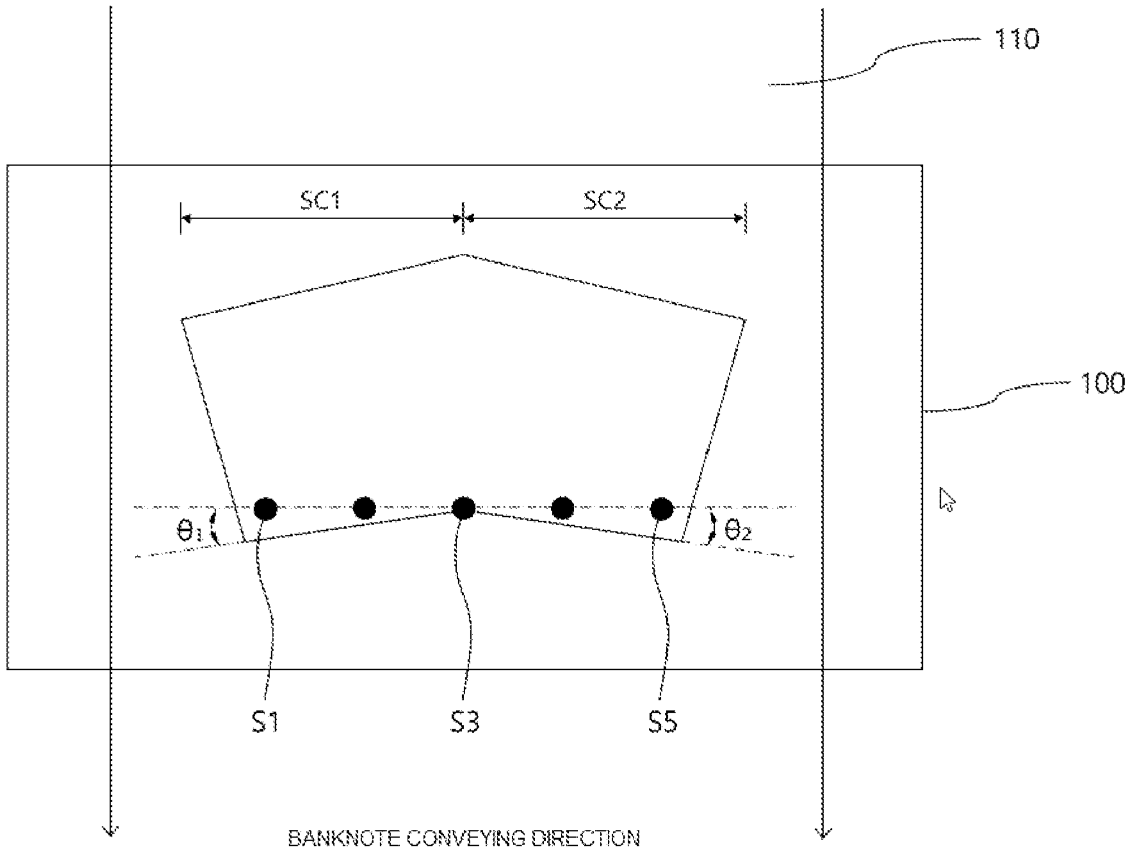
FIGS. 2A through 2C are diagrams for describing a process of detecting a skew of banknotes according to an embodiment of the present invention.
Figure 2B:
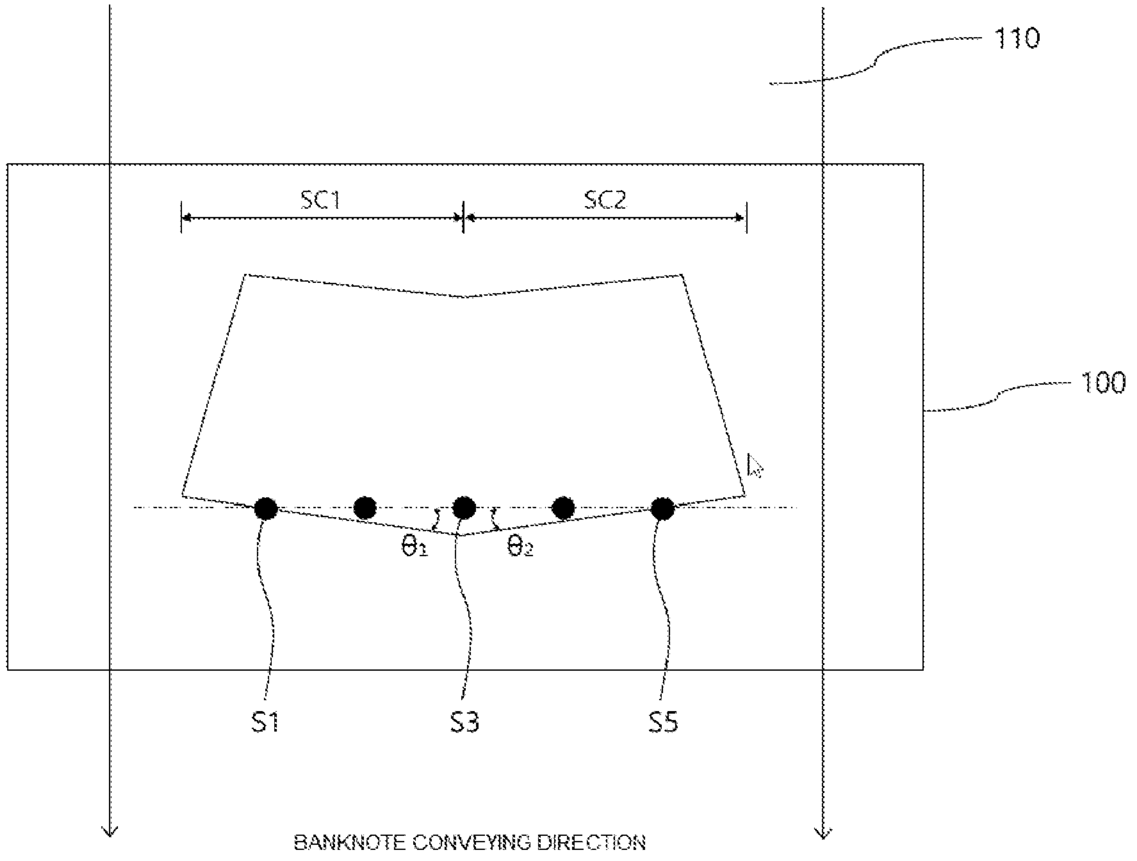
Figure 2C:
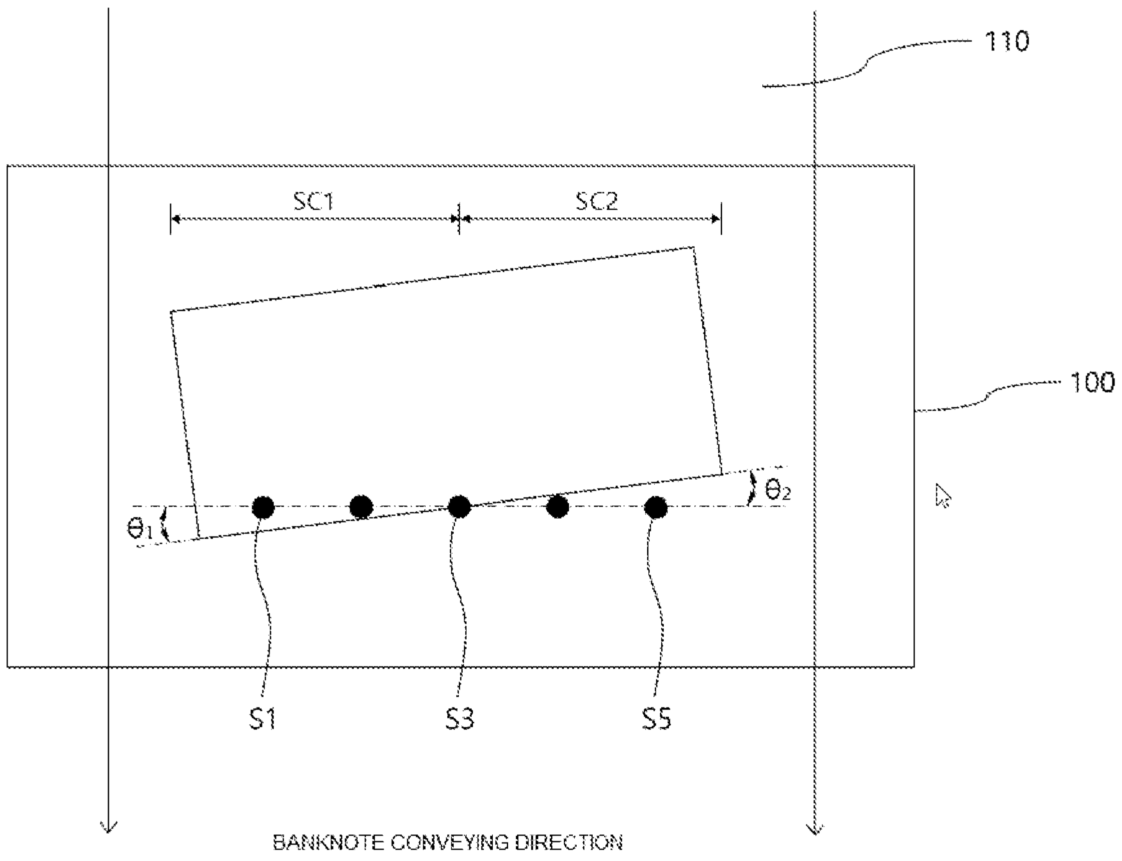

FIGS. 2A through 2C are diagrams for describing a process of detecting a skew of banknotes according to an embodiment of the present invention.

In this embodiment, FIG. 1 above illustrates that a method of detecting a skew of banknotes passing through a conveying route 110 using five detection sensors S1, S2, S3, S4, and S5 is applied. In this case, the case where the banknotes passing through the conveying route 110 through three sensors S1, S3, and S5 each provided at a center and both ends among the five sensors S1, S2, S3, S4, and S5 are divided into two left and right sectors SC1 and SC2, and the skew angles are detected for each banknote sector is illustrated as an example.

FIG. 2A is an example showing a case where a portion of a tip of a banknote is crumpled or partially folded and conveyed in a "V" shape. As illustrated in FIG. 2A, a time at which the tip of the banknote is detected by each sensor S1, S3, and S5 changes according to the skew state of the banknotes conveyed along the conveying route 110, that is, an angle at which the both ends of the banknote are tilted. In this way, skew angles $\theta 1$ and $\theta 2$ for each banknote sector SC1 and SC2 may each be calculated by considering a difference in a banknote tip detection time between each detection sensor S1, S3, and S5 and a reaction speed of the banknote.

Looking at this in more detail, as illustrated in the drawings, the banknote passing through the conveying route 110 is divided into two left and right sectors SC1 and SC2 based on the arrangement position of each detection sensor S1, S3, and S5, and the skew angle $\theta 1$ of the banknote in section 1 SC1 may be calculated through the difference in the banknote tip detection time between the first and third sensors S1 and S3, and the skew angle $\theta 2$ of the banknote in sector 2 SC2 may be calculated through the difference in the banknote tip detection time between the third and fifth sensors S3 and S5.

The total skew amount $\theta t$ ($\theta t=\theta 1+\theta 2$) of the banknote may be detected by adding up the skew angles $\theta 1$ and $\theta 2$ for each sector calculated in this way. The skew of the banknotes is determined based on the amount $\theta t$ of the banknote detected in this way. In this case, when the detected skew amount $\theta t$ of the banknote is less than a predetermined reference value (e.g., set to be 15° or 20°, etc.), it is determined that the corresponding banknote is conveyed normally, so the corresponding banknote is conveyed along the conveying route 110, while, when the detected skew amount $\theta t$ of the banknote is greater than or equal to the predetermined reference value, it is determined that the skew has occurred in the corresponding banknote, so a series of processes of correcting the skew of the banknotes may be performed by recovering the corresponding banknote, using the skew corrector briefly described above, or the like.

Similarly, FIG. 2B is an example showing a case where a part of a rear end of the banknote is crumpled or partially folded and conveyed in an inverted "V" shape in an opposite direction to that of FIG. 2A. The skew angles $\theta 1$ and $\theta 2$ for each sector SC1 and SC2 of the banknotes divided into left and right sectors may each be calculated through the difference in the banknote tip detection time detected by the first and third sensors S1 and S3 and the difference in the banknote tip detection time detected by the third and fifth sensors S3 and S5 to detect the total skew amount $\theta t$ of the banknotes passing through the conveying route 110.

In addition, FIG. 2C is an example showing the case in which the banknote is conveyed in a state inclined in one direction. Even in this case, it goes without saying that the total skew amount $\theta t$ of the banknotes passing through the conveying route 110 may be detected by calculating the skew angles $\theta 1$ and $\theta 2$ for each banknote sector SC1 and SC2 using the difference in the banknote tip detection time detected by each sensor S1, S3, and S5.

As described above, in the present invention, the total skew amount of the passing banknotes is determined by separately detecting the skew angles for each sector of the banknotes passing through the conveying route based on the banknote tip passing signals detected by each of the plurality of detection sensors provided on the conveying route inside the ATM to support more effective detection of the skew of the banknotes that is conveyed after being deformed into an irregular shape, such as a V-shaped skew having both ends inclined in different directions in addition to one-way skew of banknotes, thereby more effectively and accurately detecting a defective conveying state of the banknotes passing through the conveying route and preventing operational errors, such as jams that may occur in subsequent operations due to the skew of the banknotes, in advance.

In addition, in the above-described embodiment, although the method of detecting a skew of banknotes by dividing the banknotes into two left and right sectors SC1 and SC2 using five detection sensors S1, S2, S3, S4, and S5 has been described, the present invention is not necessarily limited thereto, the number of divided sectors of banknotes applied to the skew determination, classified according to the arrangement position of the detection sensor, etc., may be freely changed and set according to the specifications of the detection device or the application environment.

As described above, the apparatus for detecting a skew of banknotes in an ATM according to the present invention includes a plurality of sensors that are configured to be arranged on the conveying route, where the banknotes put into the ATM are conveyed, at regular intervals from each other along a direction crossing the conveying route and detect tips of the banknotes passing through the conveying route to separately detect skew angles for each sector of the banknotes passing through the conveying route based on banknote tip detection signals detected from each detection sensor and support detection of various types of skews of the banknotes, including one-way skew of the banknotes as well as V-shaped skew at both ends inclined in different directions, thereby more effectively and accurately detecting a defective conveying state of the banknotes passing through the conveying route.

In addition, the present invention described above is not limited by the above-described embodiments and accompanying drawings, and it will be clear to those skilled in the art that various substitutions, modifications, and changes are possible within the scope of the present invention without departing from the technical spirit of the present invention.

The invention claimed is:

1. An apparatus for detecting a skew of banknotes conveyed along a conveying route in an automated teller machine (ATM), the apparatus comprising:

a plurality of detection sensors on a conveying route arranged to traverse the conveying route, the plurality of detection sensors configured to detect tips of the banknotes passing through the plurality of detection sensors and generate detection signals, the plurality of detections sensor comprising a center sensor, two first sensors at a first side of the conveying route relative to the center sensor and two second sensors at a second side of the conveying route opposite to the first side; and a microprocessor coupled to the plurality of sensors and configured to:

divide each of the banknotes into a first sector and a second sector along a direction that is perpendicular to a direction along which the conveying route extends, determine a first skew angle of the first sector of each of the banknotes based on differences in timing at which the detection signals are generated by the center sensor and the two first sensors;

determine a second skew angle of the second sector of each of the banknotes based on differences in times at which the detection signals are generated by the center sensor and the two second sensors;

determine a skew amount of each of the banknotes by adding the first skew angle and the second skew angle.

2. The apparatus of claim 1, wherein the plurality of sensors are arranged with the same interval.

3. The apparatus of claim 1, wherein each of the plurality of sensors is an optical sensor including a pair of a light emitting element and a light receiving element.

4. A method of detecting a skew of banknotes conveyed in an automated teller machine (ATM), the method comprising:

detecting a center tip of each of the banknotes passing through a conveying route by a center sensor on a center line of the conveying route to generate a center detection signal;

detecting first tips of a first sector of each of the banknotes by two first sensors located at a first side of the conveying route relative to the center line to generate first detection signals;

detecting second tips of a second sector of each of the banknotes by two second sensors located at a second side of the conveying route opposite to the first side;

determining a first skew angle of the first sector of each of the banknotes based on timing of the center detection signal and the first detection signals;

determining a first skew angle of the first sector of each of the banknotes based on timing of the center detection signal and the first detection signals; and determining a skew amount of each of the banknotes by adding the first skew angle and the second skew angle.

5. The method of claim 4, further comprising determining that a skew has occurred in a banknote responsive to a skew amount of a corresponding banknote being equal to or greater than a predetermined reference value.

6. The method of claim 5, further comprising:

correcting the skew of the corresponding banknote through a skew correction device provided in the conveying route responsive to determining that the skew has occurred in the corresponding banknote.

7. The method of claim 4, wherein the center sensor, the two first sensors and the two second sensors are arranged with the same interval.

* * * * *